(12) United States Patent
Chung et al.

(10) Patent No.: US 10,673,270 B2
(45) Date of Patent: *Jun. 2, 2020

(54) LOW-HEAT WIRELESS POWER RECEIVING DEVICE AND METHOD

(71) Applicant: GE HYBRID TECHNOLOGIES, LLC, Niskayuna, NY (US)

(72) Inventors: Suk-Woo Chung, Seoul (KR); Byong-Uk Hwang, Incheon (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 15/899,252

(22) Filed: Feb. 19, 2018

(65) Prior Publication Data

US 2018/0183258 A1 Jun. 28, 2018

Related U.S. Application Data (63) Continuation of application No. 14/766,038, filed as application No. PCT/KR2014/000980 on Feb. 5, 2014, now Pat. No. 9,923,403.

(30) Foreign Application Priority Data

Feb. 5, 2013 (KR) .......................... 10-2013-0012850

(51) Int. Cl.
*H02J 7/00* (2006.01)
*H02J 7/02* (2016.01)
(Continued)

(52) U.S. Cl.
CPC ........ *H02J 7/025* (2013.01); *H02J 7/007192* (2020.01); *H02J 7/045* (2013.01);
(Continued)

(58) Field of Classification Search
CPC .. H02J 50/10; H02J 50/12; H02J 50/80; H02J 7/025; H02J 7/045; H02J 7/047; H02J 7/00; H02J 7/007192
See application file for complete search history.

(56) References Cited

U.S. PATENT DOCUMENTS

| | | | |
|---|---|---|---|
| 6,373,732 B1 | 4/2002 | Patel et al. | |
| 9,923,403 B2 * | 3/2018 | Chung | .................... H02J 7/025 |

(Continued)

FOREIGN PATENT DOCUMENTS

| | | |
|---|---|---|
| CN | 101483357 | 7/2012 |
| CN | 102884705 | 1/2013 |

(Continued)

OTHER PUBLICATIONS

"PCT Application No. PCT/KR2014/000980 International Preliminary Report on Patentability", dated Aug. 20, 2015, 17 pages.

(Continued)

*Primary Examiner* — Vuthe Siek
(74) *Attorney, Agent, or Firm* — DeLizio Law, PLLC (57) ABSTRACT

The present invention relates to low-heat wireless power receiving device and method for charging a battery with low heat by receiving a wireless power signal from a wireless power transmitting device. When a power receiving coil receives a wireless power signal, a control unit matches impedance by controlling an impedance matching/controlling unit, determines a charging load state of a power receiving unit in accordance with a time-lapse of charging the power receiving unit and a current level detected by a current detecting unit, and selectively turns on a low-heat transforming unit and a high-heat transforming unit in accordance with the selected charging load state, thereby charging the power receiving unit with minimum heat generation.

18 Claims, 5 Drawing Sheets

(51) Int. Cl.
*H02J 50/12* (2016.01)
*H02J 50/80* (2016.01)
*H02J 50/10* (2016.01)
*H02J 7/04* (2006.01)

(52) U.S. Cl.
CPC .............. *H02J 50/10* (2016.02); *H02J 50/12* (2016.02); *H02J 50/80* (2016.02)

(56) References Cited

U.S. PATENT DOCUMENTS

| | | | |
|---|---|---|---|
| 2012/0049791 A1* | 3/2012 | Tanabe | H02J 50/60 320/108 |
| 2012/0223589 A1 | 9/2012 | Low et al. | |
| 2013/0057208 A1 | 3/2013 | Takada et al. | |
| 2013/0154383 A1 | 6/2013 | Kasturi et al. | |
| 2013/0281160 A1* | 10/2013 | Han | H04W 88/02 455/566 |
| 2016/0064991 A1 | 3/2016 | Chung et al. | |

FOREIGN PATENT DOCUMENTS

| | | |
|---|---|---|
| JP | 2003009515 | 1/2003 |
| JP | 2011234112 | 11/2011 |
| KR | 10-1034740 | 5/2011 |
| KR | 20120069349 | 6/2012 |
| KR | 20120128099 | 11/2012 |
| KR | 20120128114 | 11/2012 |
| KR | 20120133080 | 12/2013 |
| WO | 2014123350 | 8/2014 |

OTHER PUBLICATIONS

"PCT Application No. PCT/KR2014/000980 International Search Report", dated Jun. 5, 2014, 19 pages.
"U.S. Appl. No. 14/766,038 Office Action", dated Jun. 7, 2017, 5 pages.
"Chinese Application No. 20140007330.1 Office Action", dated Feb. 11, 2019, 7 pages.
"Chinese Application No. 20140007330.1 Office Action", dated Feb. 6, 2018, 8 pages.
"Korean Application No. 10-2013-0012850 Notification of Reason for Refusal", dated Mar. 8, 2019, 4 pages.
"Korean Application No. 10-2013-0012850 Written Opinion", dated May 7, 2019, 4 pages.
"Qi System Description Wireless Power Transfer", Wireless Power Consortium, vol. 1:Low Power, Part 1:Interface Definition, Version 1.0.1, Oct. 2010, 88 pages.

\* cited by examiner

| STATE | RANGE OF CHARGING CURRENT | RANGE OF OUTPUT VOLTAGE | OPERATION |
|---|---|---|---|
| INITIAL STATE | - | 7.0 ~ 10.5V | BOTH LOW-HEAT AND HIGH-HEAT TRANSFORMING UNIT TURNED OFF |
| INITIAL LIGHT LOAD STATE | 200 ~ 1000mA | 5.45 ~ 5.6V | HIGH-HEAT TRANSFORMING |
| MIDDLE LOAD STATE | 350 ~ 1000mA | 5.15 ~ 5.3V | LOW-HEAT TRANSFORMING UNIT TURNED ON |
| LIGHT LOAD STATE | 200 ~ 500mA | 5.45 ~ 6.0V | HIGH-HEAT TRANSFORMING UNIT TURNED ON |
| CHARGE COMPLETED STATE | 80mA or less | 7.2 ~ 7.4V | HIGH-HEAT TRANSFORMING UNIT TURNED ON |

LOW-HEAT WIRELESS POWER RECEIVING DEVICE AND METHOD

CROSS-REFERENCE TO RELATED APPLICATIONS

This application is a continuation of U.S. application Ser. No. 14/766,038 filed Sep. 21, 2015, which is a national stage of International Application No. PCT/KR2014/000980 filed Feb. 5, 2014, which claims the benefit of priority to Korean Application No. 10-2013-0012850, filed Feb. 5, 2013, in the Korean Intellectual Property Office, the disclosures of which are incorporated herein by reference.

TECHNICAL FIELD

The present invention relates to a low-heat wireless power receiving device configured to charge a battery with low heat by receiving a wireless power signal from a wireless power transmitting device, and a method thereof.

BACKGROUND

In general, various portable terminals such as a mobile phone and a PDA (Personal Digital Assistant) are equipped with a power receiving device such as a battery pack charged with a power to supply an operation power. The power receiving device is charged with a power from an external charging device and supplies the power to a portable terminal so that the portable terminal can operate.

The power receiving device may include battery cells charged with a power and a charging/discharging circuit for charging the battery cells with power from an external charging device and supplying the charged power to a portable terminal, and the like.

As a type of connecting the charging device and the power receiving device, there has been known a terminal connection type that directly connects a power output terminal of a charging device, which receives a utility AC power and outputs a power of a voltage and a current corresponding to the power receiving device, with a power input terminal of the power receiving device through a cable.

However, according to the terminal connection type, there is a potential difference between the terminal of the charging device and the terminal of the power receiving devices, so instantaneous discharge is generated when the terminal of the charging device and the terminal of the power receiving device are brought in contact with each other or separated from each other.

The instantaneous discharge wears the terminal of the charging device and the terminal of the power receiving device, and when dirt is accumulated on the terminal of the charging device and the terminal of the power receiving device, heat is generated from the dirt and may cause a safety accident such as a fire.

The power stored in the battery cells of the power receiving device is naturally discharged to the outside through the terminal of the power receiving device due to humidity etc., so there is a problem in that the lifespan and performance of the power receiving device are decreased.

Recently, in order to solve the various problems with the terminal connection type, a wireless power receiving device that charges battery cells by receiving a wireless power signal transmitted from a wireless power transmitting device has been proposed (see Korean Patent Application Publication No. 10-2012-0128114).

The wireless power receiving device is, for example, connected with the wireless power transmitting device in an electromagnetic induction type, receives a wireless power signal wirelessly transmitted from the wireless power transmitting device, and charges battery cells with a received power.

There have been many efforts for allowing the wireless power receiving device to wirelessly receive a power stably and with high efficiency and charge battery cells.

The wireless power receiving device rectifies a wireless power signal received from the wireless power transmitting device with a rectifier to convert it to a DC power and the voltage level of the DC power is converted to a voltage level corresponding to the battery cells by a DC/DC converter and then the battery cells are charged with the power.

However, converting the voltage level of the DC power with the DC/DC converter generates a large amount of heat while the DC/DC converter converts the voltage level of DC power, so power consumption increases and there is a need for a specific heat discharge unit for discharging the heat generated from the DC/DC converter.

Further, since the heat discharge unit is mounted on a circuit board, the circuit board increases in size.

DISCLOSURE

The present invention provides low-heat wireless power receiving device and method capable of reducing heat generated in a process of charging a power receiving device with received power.

Further, the present invention provides a low-heat wireless power receiving device including a low-heat transforming unit and a high-heat transforming unit and being capable of reducing a loss of power and heat generation by charging a power receiving device with a power while selectively operating the low-heat transforming unit and the high-heat transforming unit, depending on a charging power of the power receiving device, and a low-heat wireless power receiving method.

According to low-heat wireless power receiving device and method of the present invention, a low-heat transforming unit configured to operate with low heat and supply a charging power to a power receiving unit and a high-heat transforming unit configured to operate with high heat and supply a stable charging power to the power receiving unit are provided in a charging power output unit.

Further, a control unit determines a charging load of the power receiving unit as an initial light load state at an initial stage where a battery starts to be charged, and turns on the high-heat transforming unit in accordance with the determined initial light load state so that the power receiving unit can be supplied with a stable charging power.

Further, when stable charging power is supplied to the power receiving unit in the initial light load state for a predetermined time, a middle load state is determined, and the low-heat transforming unit is turned on so that a sufficient charging power is supplied to the power receiving unit.

In this case, before the low-heat transforming unit is turned on, both the low-heat transforming unit and the high-heat transforming unit are turned on first while a stable power is supplied to the low-heat transforming unit, and when the low-heat transforming unit has supplied a stable power for a predetermined time, the high-heat transforming unit is turned off, thereby minimizing heat generation.

Further, the control unit determines a charging current of the power receiving unit and determines whether the power charging of the power receiving unit is in a light load state or in a charged-up state in accordance with the determined charging current.

When the power charging of the power receiving unit is in the light load state, the control unit turns on the high-heat transforming unit so that a charging power can be supplied until the power receiving unit is charged up.

Further, when it is determined that the power receiving unit has been charged up, the control unit turns off both the low-heat transforming unit and the high-heat transforming unit and finishes charging.

Therefore, a low-heat wireless power receiving device of the present invention includes: a power receiving coil configured to receive a wireless power signal; an impedance matching/rectifying unit configured to match impedance so that the power receiving coil can resonate with the wireless power signal, and to rectify the wireless power signal to convert it to a DC power; a charging power supply unit including a low-heat transforming unit and a high-heat transforming unit connected in parallel with each other and supplying an output power of the impedance matching/rectifying unit to a power receiving unit as a charging power; a current detecting unit configured to detect a current level of power stored in the power receiving unit; and a control unit configured to control an impedance matching of the impedance matching/rectifying unit, to determine a charging load state of the power receiving unit in accordance with a time-lapse of charging the power receiving unit and the current level detected by the current detecting unit, and to selectively turn on the low-heat transforming unit and the high-heat transforming unit in accordance with the determined charging load state.

The control unit determines an initial light load state to turn off the low-heat transforming unit and to turn on the high-heat transforming unit when the power receiving unit starts to be charged, and determines a middle load state to turn on the low-heat transforming unit and to turn off the high-heat transforming unit when a predetermined initial charging time has passed.

Further, the control unit both turns on both the low-heat transforming unit and the high-heat transforming unit for a predetermined time when the control unit determines a middle load, and the control unit maintains the low-heat transforming unit being turned on and turns off the high-heat transforming unit when the predetermined time has passed.

Further, the control unit determines a light load state to turn off the low-heat transforming unit and turns on the high-heat transforming unit when a detection current level of the current detecting unit enters a predetermined range of a first level.

Further, the control unit both turns on both the low-heat transforming unit and the high-heat transforming unit for a predetermined time when the control unit determines the light load state, and the control unit turns off the low-heat transforming unit and turns on the high-heat transforming unit when the predetermined time has passed.

Further, the control unit turns off both the low-heat transforming unit and the high-heat transforming unit when the control unit determines that the power receiving unit has been charged up on the basis of a detection current of the current detecting unit.

The low-heat transforming unit may be a transforming unit using an FET as a switching element and the high-heat transforming unit may be an LDO.

Further, a low-heat wireless power receiving method of the present invention includes: matching impedance by controlling an impedance matching/controlling unit by means of a control unit when a wireless power signal is received by a power receiving coil; determining a charging load state of the power receiving unit in accordance with a time-lapse of charging the power receiving unit and a current level detected by a current detecting unit by means of the control unit; and charging the power receiving unit with a charging power based on the wireless power signal by selectively turning on the low-heat transforming unit and the high-heat transforming unit in accordance with the determined charging load state by means of the control unit.

The determining of a charging load state of the power receiving unit in accordance with a time-lapse of charging the power receiving unit and a current level detected by a current detecting unit by means of the control unit, may include determining the charging load state of the power receiving unit as an initial light load state at an initial stage where the power receiving unit starts to be charged and determining a middle load state when a predetermined initial charging time has passed.

The charging of the power receiving unit with a charging power based on the wireless power signal by selectively turning on the low-heat transforming unit and the high-heat transforming unit in accordance with the determined charging load state may include: turning off the low-heat transforming unit and turning on the high-heat transforming unit in the initial light load state; and turning on the low-heat transforming unit and turning off the high-heat transforming unit when the middle load is determined.

The turning-on of the low-heat transforming unit and turning-off of the high-heat transforming unit when the middle load is determined may include: turning on both the low-heat transforming unit and the high-heat transforming unit for a predetermined time; and turning on the low-heat transforming unit and turning off the high-heat transforming unit when the predetermined time has passed.

The determining of a charging load state of the power receiving unit in accordance with a time-lapse of charging the power receiving unit and a current level detected by a current detecting unit by means of the control unit may include: determining a light load state when a detection current level of the current detecting unit enters a predetermined range of a first level; and determining that the power receiving unit has been charged up when the detection current level of the current detecting unit is equal to or less than a second level set lower than the first level.

The determining of a light load state when a detection current level of the current detecting unit enters a predetermined range of a first level may include turning off the low-heat transforming unit and turning on the high-heat transforming unit by means of the control unit.

The turning-off of the low-heat transforming unit and turning-on of the high-heat transforming unit by means of the control unit may include: turning on both the low-heat transforming unit and the high-heat transforming unit for a predetermined time by means of the control unit; and turning off the low-heat transforming unit and keeping the high-heat transforming unit being turned on by means of the control unit when the predetermined time has passed.

The determining that the power receiving unit has been charged up when the detection current level of the current detecting unit is equal to or less than a second level set lower than the first level may include: turning off both the low-heat transforming unit and the high-heat transforming unit by means of the control unit.

The low-heat wireless power receiving device and method of the present invention include low-heat transforming unit and a high-heat transforming unit, determines a power charging load state of a power receiving unit in accordance with time taken to charging the power receiving unit and an output current, and can supply a charging power to the power receiving unit by selectively turning off the low-heat transforming unit and the high-heat transforming unit in accordance with the determined power charging load state.

Therefore, it is possible to charge a power receiving unit with a sufficient power while minimizing heat generation and to reduce power consumption due to low heat generation.

BRIEF DESCRIPTION OF THE DRAWINGS

Hereinafter, the present invention will be described with reference to the accompanying drawings through embodiment not limiting the present invention and the same components are given the same reference numbers is some of the drawings.

DESCRIPTION OF EMBODIMENT(S)

Hereinafter, low-heat wireless power receiving device and method of the present invention will be described in detail with reference to the drawings.

The suffixes "module" and "unit" used for the components in the following description are provided or used in consideration of only convenience of describing the specification and they do not have differentiated meanings or functions by themselves.

Figure 1:
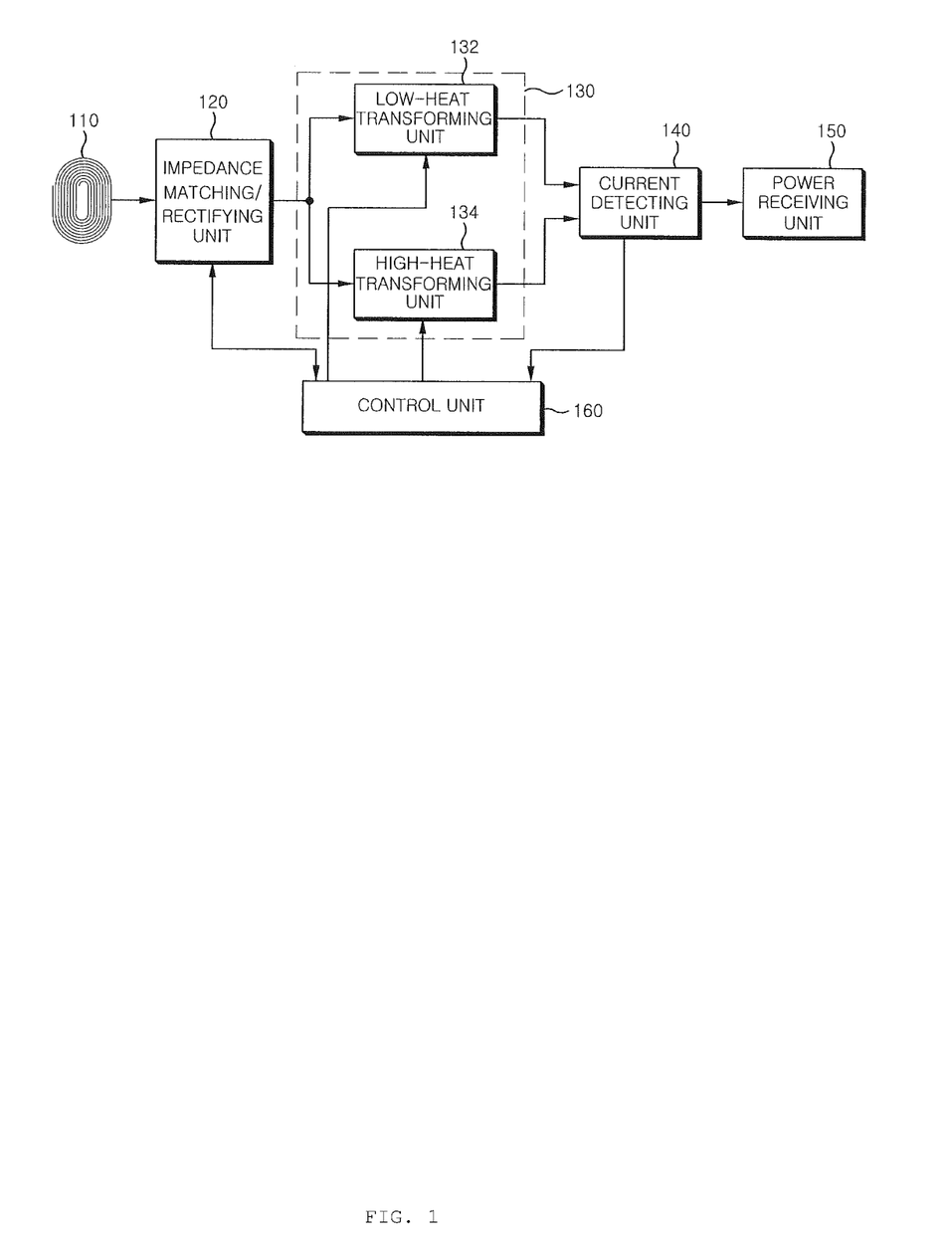
FIG. 1 is a block diagram illustrating the configuration of a low-heat wireless power receiving device of the present invention.

FIG. 1 is a block diagram illustrating the configuration of a low-heat wireless power receiving device of the present invention. Referring to FIG. 1, a low-heat wireless power receiving device of the present invention may include a power receiving coil 110, an impedance matching/rectifying unit 120, a charging power supply unit 130, a current detecting unit 140, a power receiving unit 150 (for example, a battery cell), and a control unit 160.

The power receiving coil 110 is connected with a power transmitting coil of a wireless power transmitting device, for example, an electromagnetic induction type or a magnetic resonance type and receives a wireless power signal from the power transmitting coil.

The impedance matching/rectifying unit 120 matches impedance so that the power receiving coil 110 can resonate with the wireless power signal, and rectifies a wireless power signal received by the power receiving coil 110 to convert it to a DC power.

The charging power supply unit 130 outputs the DC power, which is outputted from the impedance matching/rectifying unit 120, as a charging power for charging the power receiving unit 150 and may include a low-heat transforming unit 132 and a high-heat transforming unit 134.

The low-heat transforming unit 132 uses a switching element such as an FET (Field Effect Transistor), so when the switching element is turned on, it passes and outputs the DC power outputted from the impedance matching/rectifying unit 120 as a charging power, and when the switching element is turned off, it blocks the DC power outputted from the impedance matching/rectifying unit 120. The low-heat transforming unit 132 does not change the level of the DC power outputted from the impedance matching/rectifying unit 120, but passes or blocks the DC power by switching, so it cannot supply a stable DC power to the power receiving unit 150, but generates heat very little because it does not reduce the voltage level of the DC power.

The high-heat transforming unit 134 uses, for example, an LDO (Low Drop Output), so when the LDO is turned on, it reduces and outputs the DC power outputted from the impedance matching/rectifying unit 120 at a voltage level required by the power receiving unit 150, and when the LDO is turned off, it blocks the DC power outputted from the impedance matching/rectifying unit 120. Since the high-heat transforming unit 134 outputs a DC power at a voltage level required by the power receiving unit 150, it can supply a stable DC power to the power receiving unit 150, but a large amount of heat is generated in the process of downing the voltage level.

The current detecting unit 140 detects the current of a charging power outputted from the low-heat transforming unit 132 or the high-heat transforming unit 134 of the charging power supply unit 130 and stored in the power receiving unit 150.

The control unit 160 controls impedance of the impedance matching/rectifying unit 120 so that the power receiving coil 110 can optimally receive a wireless power signal, determines a charging load state of the power receiving unit 150 in accordance with the charging time of the power receiving unit 150 and the detected current of the current detecting unit 140, and controls charging of the power receiving unit 150 by selectively turning on and off the low-heat transforming unit 132 and the high-heat transforming unit 134 in accordance with the determined load state.

Figure 2:
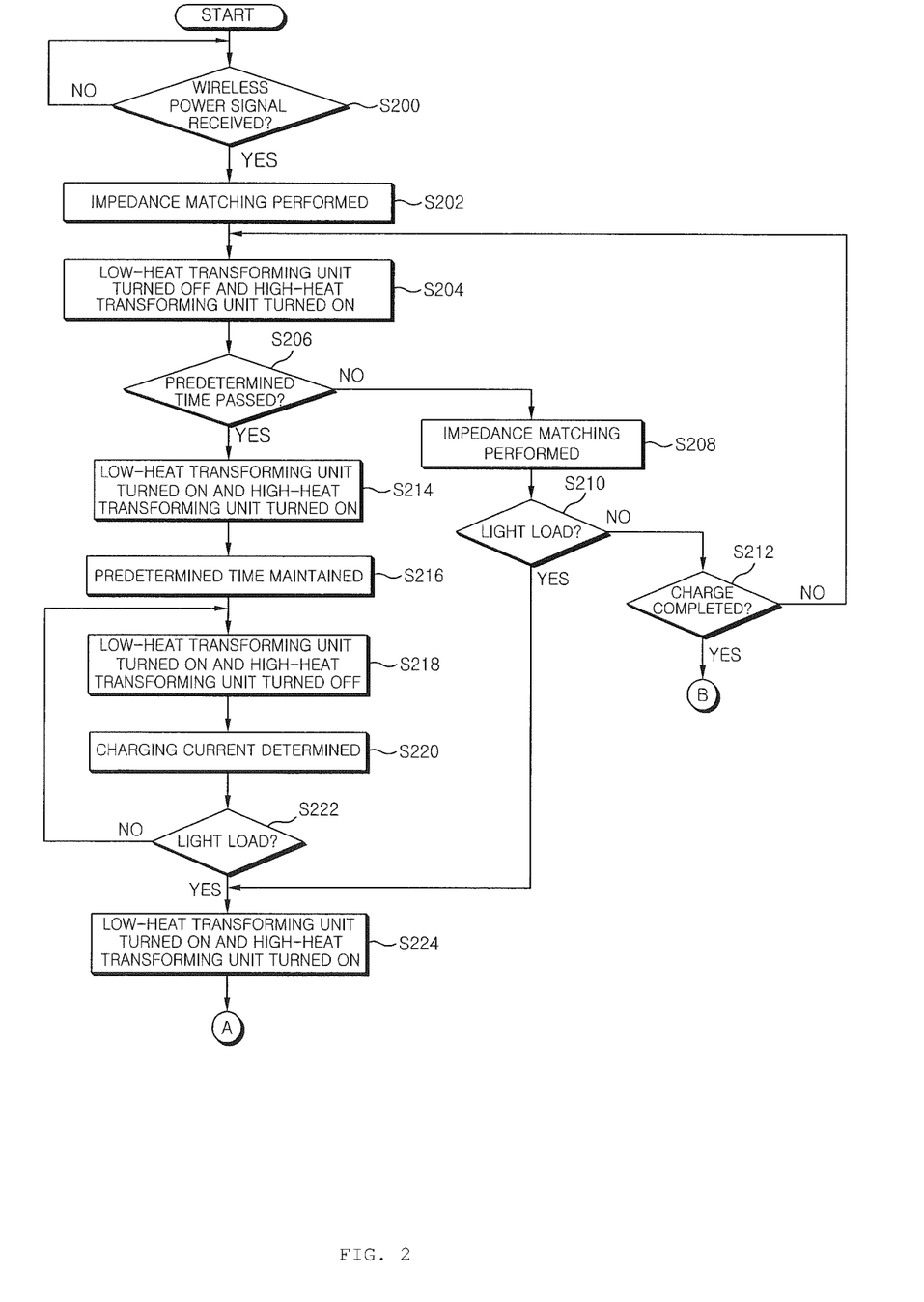
FIGS. 2 and 3 are signal flowchart illustrating operation of a control unit according to a low-heat wireless power receiving device of the present invention.
Figure 3:
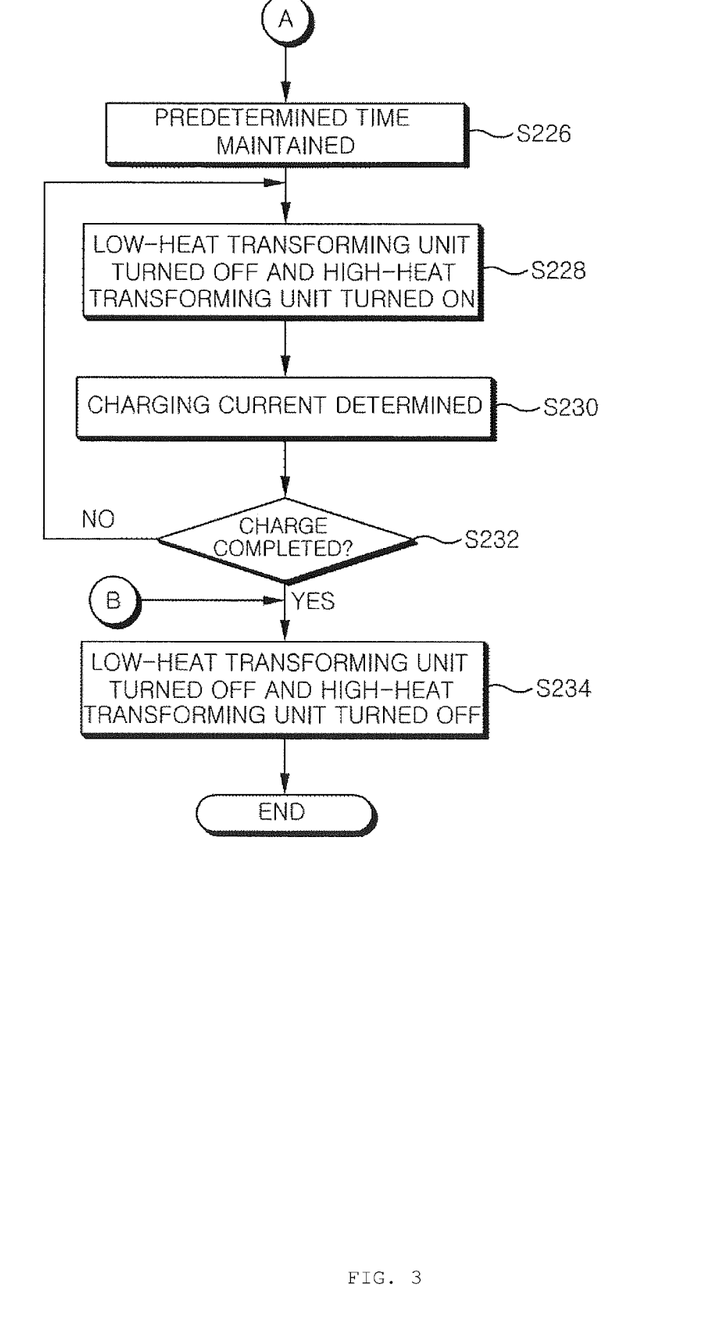

FIGS. 2 and 3 are signal flowchart illustrating operation of a control unit according to a low-heat wireless power receiving device of the present invention. Referring to FIG. 2, the control unit 160 determines whether a wireless power signal is received by the impedance matching/rectifying unit 120 (S200). That is when a wireless power transmitting device transmits a wireless power signal, the power receiving coil 110 receives the wireless power signal, the received wireless power signal is inputted to the impedance matching/rectifying unit 120, and the control unit 160 whether the wireless power signal is received, by monitoring the impedance matching/rectifying unit 120.

When the wireless power signal is received, as the result of determination, the control unit 160 performs operation of matching impedance by controlling the impedance matching/rectifying unit 120 (S202).

The operation of matching the impedance of the impedance matching/rectifying unit 120 is made in various ways.

For example, the control unit 160 may match the impedance by receiving a setting value for matching the impedance of the impedance matching/rectifying unit 120 in communication with the wireless power transmitting device through a communication unit (not illustrated) and controlling the impedance matching/rectifying unit 120 in accordance with the received setting value.

Alternatively, the setting value has a predetermined range and the control unit 160 can match the impedance by detecting the intensity of the received wireless power signal while changing the impedance of the impedance matching/ rectifying unit 120 in accordance with the range of the setting value and by controlling the impedance matching/rectifying unit 120 so that the detected intensity of the wireless power signal becomes the maximum.

Alternatively, the control unit 160 may match the impedance by detecting the intensity of the received wireless power signal while changing the impedance of the impedance matching/rectifying unit 120 and by controlling the impedance matching/rectifying unit 120 so that the detected intensity of the wireless power signal becomes the maximum.

Further, the impedance of the impedance matching/rectifying unit 120 can be matched in various ways other than these ways described above.

In this state, the impedance matching/rectifying unit 120 rectifies a wireless power signal inputted from the power receiving coil 100 to convert it to a DC power and outputs the DC power to the low-heat generator 132 and the high-heat generator 134 of the charging power supply unit 130.

In this case, the control unit 160 does not supply a power to the power receiving unit 150, so in which the low-heat transforming unit 132 and the high-heat transforming unit 134 of the charging power supply unit 130 are both turned off.

Figure 4:
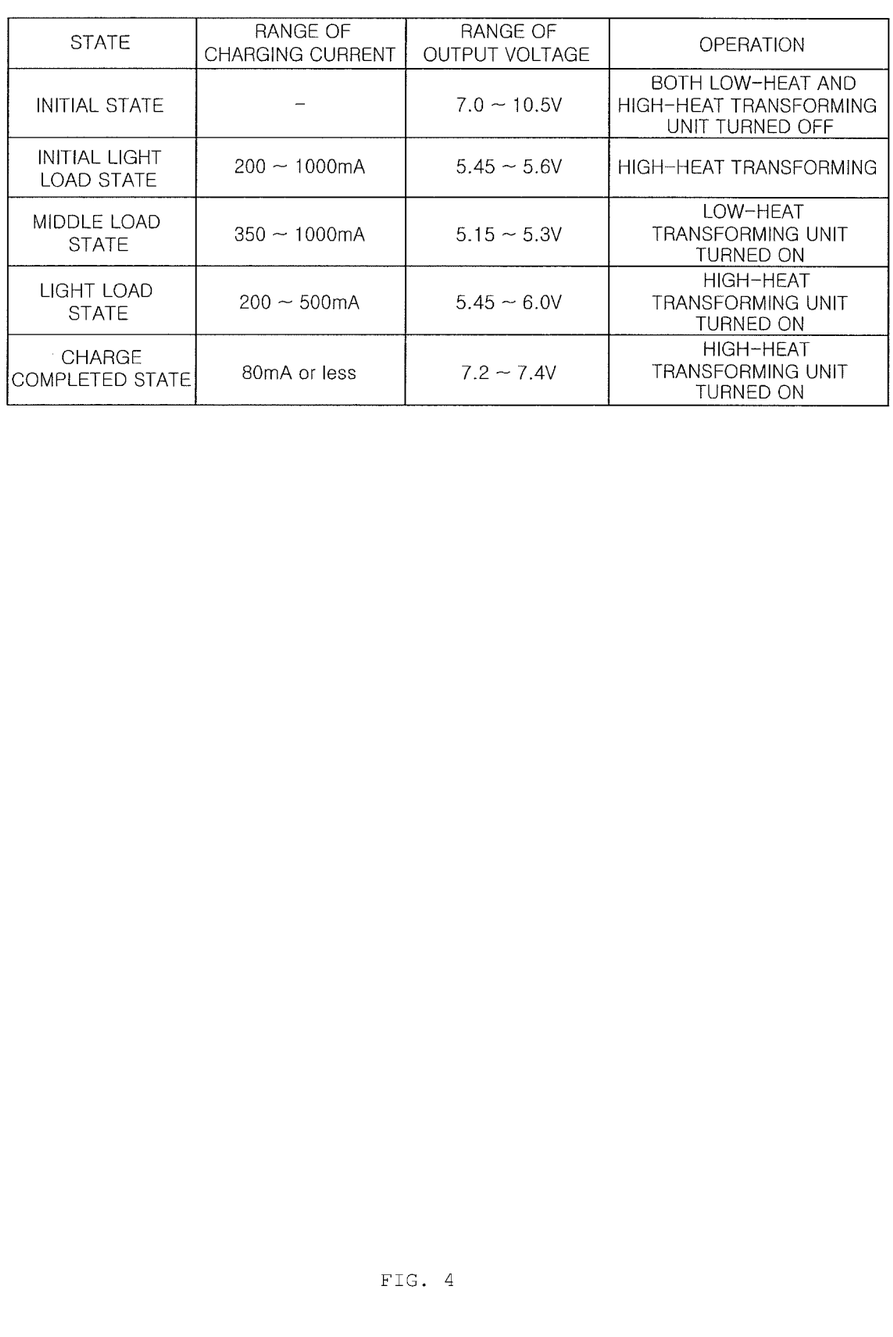
FIG. 4 is a table listing example of output voltages of an impedance matching/rectifying unit and charging currents of power receiving device according to the present invention.
Figure 5:
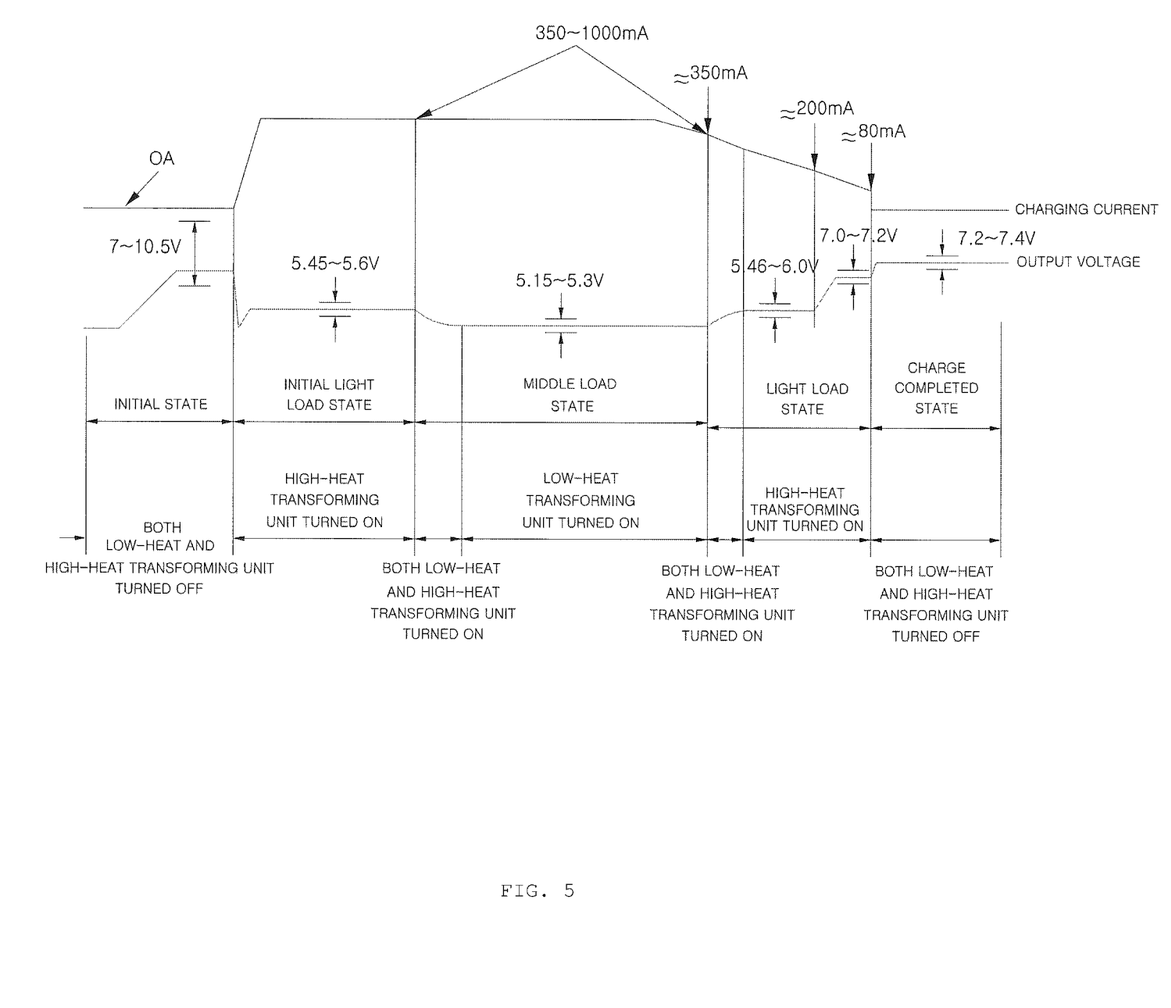
FIG. 5 is a graph illustrating operation by exemplifying output voltages of an impedance matching/rectifying unit and charging currents of power receiving device according to the present invention.

Accordingly, the voltage level of the power outputted from the impedance matching/rectifying unit 120 is, for example, about 7 to 10.5 V and no current is detected by the current detecting unit 140, as illustrated in FIGS. 4 and 5.

In this state, at the initial stage of charging the power receiving unit 150, the control unit 160 determines that the charging load of the power receiving unit 150 is in an initial light load state, turns off the low-heat transforming unit 132 of the charging power supply unit 130, and turns on the high-heat transforming unit 134 (S204).

Then the high-heat transforming unit 134 outputs the voltage level of the DC power outputted by the impedance matching/rectifying unit 120 through DC/DC conversion and the DC power outputted from the high-heat transforming unit 134 is inputted and stored in the power receiving unit 150 through the current detecting unit 140.

Herein, the high-heat transforming unit 134 downs the voltage level of the DC power outputted from the impedance matching/rectifying unit 120 to the voltage level required by the power receiving unit 150 and then outputs it, as described above, so a stable DC power is supplied to the power receiving unit 150, but high-heat transforming unit 134 changes the voltage level of the DC power through DC/DC conversion, so it generates a large amount of heat.

Further, the high-heat transforming unit 134 outputs a DC power and the power receiving unit 150 is charged with the DC power, so the voltage level of the DC power outputted from the impedance matching/rectifying unit 120 decreases to, for example, about 5.45 to 5.6 V, as illustrated in FIGS. 4 and 5, and the current detecting unit 140, though depending on the charging state of the power receiving unit 150, detects a current of, for example, 200 to 1000 mA when the charging state is low.

Herein, the reason that the control unit 160 charges the power receiving unit 150 by turning on the high-heat transforming unit 134 when it is a initial light load state, the control unit 160 is for charging the power receiving unit 150 with a stable DC power.

In this state, the control unit 160 determines whether the charging setting time has passed in the initial light load state.

When the charging setting time has not passed yet, as the result of determination, the control unit 160 determines the current level of the power stored in the power receiving unit 150 by inputting the detection current of the current detecting unit 140 (S208) and determines whether the charging load of the power receiving unit 150 is in a light load state or a charged-up state on the basis of the determined current level (S210 and S212).

That is, when charging is started with the power receiving unit 150 charged with a power, the current level of the power stored in the power receiving unit 150 decreases in accordance with the amount of an accumulated power, so, for example when the current level of the power stored in the power receiving unit 150 is 200 to 500 mA, the control unit 160 determines that the charging load of the power receiving unit 150 is light load, but when it is 80 mA or less, it determines that the power receiving unit 150 has been charged up.

When the charging load of the power receiving unit 150 is not in a light load state or a charged-up state, as the result of determination in S208, the control unit 160 returns to S204 and then charges the power receiving device 150 with a power by keeping the low-heat transforming unit 132 of the charging power supply unit 130 being turned off and keeping the high-heat transforming unit 134 being turned on, and repeats determining whether the charging selling time has passed.

In this state, when the charging setting time has passed, the power receiving unit 150 has been charged up with a stable initial power and the control unit 160 determines that the charging load of the power receiving unit 150 is in a middle load state.

When the control unit 160 determines that the charging load of the power receiving unit 150 is in a middle load state, the control unit 160 turns on both the low-heat transforming unit 132 and the high-heat transforming unit 134 so that the DC power outputted from the impedance matching/rectifying unit 120 passes through the low-heat transforming unit 132 and the high-heat transforming unit 134 and charges the power receiving unit 150 through the current detecting unit 140 (S214), and maintains both the low-heat transforming unit 132 and the high-heat transforming unit 134 being turned on for a predetermined time (S216).

Herein, the reason that the control unit 160 maintains both the low-heat transforming unit 132 and the high-heat transforming unit 134 being turned on for a predetermined time is for making the high-heat transforming unit 134 keep supplying a charging power until the low-heat transforming unit 132 outputs a charging power.

After maintaining both the low-heat transforming unit 132 and the high-heat transforming unit 134 being turned on for a predetermined time, the control unit 160 keeps the low-heat transforming unit 132 being turned on and turns off the high-heat transforming unit 134 (S218).

As the control unit 160 keeps the low-heat transforming unit 132 being turned on, the power receiving unit 150 keeps being charged and heat generation by the charging can be minimized.

In this case, the voltage level of the DC power outputted from the impedance matching/rectifying unit 120 decreases, for example, to about 5.15 to 5.3 V, as illustrated in FIGS. 4 and 5, and the current detecting unit 140, though depending on the charging state of the power receiving unit 150, detects a current of 350 to 1000 mA.

In this state, the control unit 160 determines the current level of the DC power stored in the power receiving unit 150 by inputting the detection current of the current detecting unit 140 (S220) and determines whether the charging load of the power receiving unit 150 has changed into a light load state on the basis of the determined current level (S222).

That is, the control unit 160 determines whether the current level of the DC power stored in the power receiving unit 150 is, for example, 200 to 500 mA, and when it is 200 to 500 mA, it determines that the charging load of the power receiving unit 150 is in a light load state.

When the control unit 160 determines a light load state in S210 or S222, it turns on both the low-heat transforming unit 132 and the high-heat transforming unit 134 (S224) and maintains both the low-heat transforming unit 132 and the high-heat transforming unit 134 being turned on for a predetermined time (S226).

Herein, the reason that the control unit 160 maintains both the low-heat transforming unit 132 and the high-heat transforming unit 134 being turned on for a predetermined time is for making the low-heat transforming unit 132 keeps supplying a charging power until the high-heat transforming unit 132 starts to output a stable power.

After maintaining both the low-heat transforming unit 132 and the high-heat transforming unit 134 being turned on for a predetermined time, the control unit 160 turns off the low-heat transforming unit 132 and maintains the high-heat transforming unit 134 being turned on so that the high-heat transforming unit 134 supplies a charging power to the power receiving unit 150 (S228).

In this case, as the high-heat transforming unit 134 supplies a charging power to the power receiving unit 150, the voltage level of the DC power outputted from the impedance matching/rectifying unit 120 increases, for example, to about 5.45 to 6.0 V, as illustrated in FIGS. 4 and 5, and increases, for example, to 7.0 to 7.2 V as time passes, and the current detecting unit 140, though depending on the charging state of the power receiving unit 150, detects a current of about 200 to 500 mA.

In this state, the control unit 160 determines the current level of the power stored in the power receiving unit 150 by inputting the detection current of the current detecting unit 140 (S230) and determines whether the power receiving unit 150 has been charged up on the basis of the determined current level (S232). That is, as illustrated in FIGS. 4 and 5, when the power receiving unit 150 is charged up, the voltage level of the DC power outputted from the impedance matching/rectifying unit 120 increases, for example, to about 7.2 to 7.4 V and the detection current of the current detecting unit becomes about 80 mA or less, for example.

When the detection current of the current detecting unit 140 is about 80 mA or less, the control unit 160 determines that the power receiving unit 150 has been charged up, turns off both the low-heat transforming unit 132 and the high-heat transforming unit 134 (S234), and finishes charging.

The low-heat wireless power receiving device and method described above is not limited to the configuration and method of the embodiments described above, and all or some of the embodiments may be selectively combined so that the embodiments can be modified in various ways.

What is claimed is:

1. A wireless power receiving device, comprising:
    a power receiving coil configured to receive wireless power;
    a rectifying unit configured to convert the wireless power to a source power;
    a first power transforming unit that includes a switching element configured to convert the source power to a first charging power and provide the first charging power to a power receiving unit when the first power transforming unit is turned on;
    a second power transforming unit that includes a voltage regulator configured to convert the source power to a second charging power and provide the second charging power to the power receiving unit when the second power transforming unit is turned on; and
    a control unit coupled with the first power transforming unit and the second power transforming unit, the control unit configured to:
        determine a charging load state and amount of power stored in the power receiving unit, and
        selectively turn on the first power transforming unit and the second power transforming unit based, at least in part, on the charging load state and the amount of power stored in the power receiving unit.

2. The wireless power receiving device of claim 1, wherein the first power transforming unit and the second power transforming unit are connected in parallel with each other between the rectifying unit and the power receiving unit.

3. The wireless power receiving device of claim 1, wherein the first power transforming unit includes a low-heat transforming unit, and the second power transforming unit includes a high-heat transforming unit.

4. The wireless power receiving device of claim 1, wherein the first power transforming unit includes a field effect transistor (FET) as the switching element and the second power transforming unit includes a low drop output (LDO) voltage regulator.

5. The wireless power receiving device of claim 1, wherein the first power transforming unit has a lower power loss than the second power transforming unit, and the second power transforming unit provides a greater charging power than the first power transforming unit.

6. The wireless power receiving device of claim 1, further comprising:
    a current detecting unit configured to detect the charging load state and the amount of power stored in the power receiving unit.

7. The wireless power receiving device of claim 1, wherein the rectifying unit includes an impedance matching/rectifying unit configured to match an impedance so that the power receiving coil can resonate with the wireless power, wherein the control unit is further configured to control the impedance.

8. The wireless power receiving device of claim 1, wherein the control unit is configured to:
    determine an initial light load state of the power receiving unit when the power receiving unit starts to be charged,
    turn off the first power transforming unit and turn on the second power transforming unit during the initial light load state,
    determine a middle load state of the power receiving unit after a predetermined initial charging time, and
    turn on the first power transforming unit and turn off the second power transforming unit during the middle load state.

9. The wireless power receiving device of claim 8, wherein the control unit configured to turn on the first power transforming unit and turn off the second power transforming unit during the middle load state includes the control unit being configured to:
    turn on both the first power transforming unit and the second power transforming unit for a predetermined time in response to determining the middle load state, and
    maintain the first power transforming unit being turned on and turn off the second power transforming unit when the predetermined time has passed.

10. The wireless power receiving device of claim 1, wherein the control unit is configured to:
   determine a subsequent light load state when the power receiving unit reaches a first level lower than a charged-up state, and
   turn off the first power transforming unit and turn on the second power transforming unit.

11. The wireless power receiving device of claim 10, wherein the control unit configured to turn off the first power transforming unit and turn on the second power transforming unit includes the control unit being configured to:
   turn on both the first power transforming unit and the second power transforming unit for a predetermined time in response to determining the subsequent light load state, and
   maintain the second power transforming unit being turned on and turn off the first power transforming unit when the predetermined time has passed.

12. The wireless power receiving device of claim 1, wherein the control unit is configured to:
   determine that the power receiving unit has been charged up, and
   turn off both the first power transforming unit and the second power transforming unit.

13. A method performed by a wireless power receiving device, the method comprising:
   receiving wireless power using a power receiving coil;
   converting the wireless power to a source power;
   determining a charging load state and amount of power stored in a power receiving unit of the wireless power receiving device; and
   selectively turning on a first power transforming unit or a second power transforming unit or both the first power transforming unit and the second power transforming unit based, at least in part, on the charging load state and the amount of power stored in the power receiving unit, wherein the first power transforming unit includes a switching element configured to convert the source power to a first charging power and provide the first charging power to a power receiving unit when the first power transforming unit is turned on, and wherein the second power transforming unit includes a voltage regulator configured to convert the source power to a second charging power and provide the second charging power to the power receiving unit when the second power transforming unit is turned on.

14. The wireless power receiving device of claim 13, further comprising:
   detecting, by a current detecting unit, the charging load state and the amount of power stored in the power receiving unit.

15. The wireless power receiving device of claim 13, further comprising:
   matching an impedance of the rectifying unit so that the power receiving coil can resonate with the wireless power.

16. The wireless power receiving device of claim 13, further comprising:
   determining an initial light load state of the power receiving unit when the power receiving unit starts to be charged;
   turning off the first power transforming unit and turning on the second power transforming unit during the initial light load state;
   determining a middle load state of the power receiving unit after a predetermined initial charging time; and
   turning on the first power transforming unit and turning off the second power transforming unit during the middle load state.

17. The wireless power receiving device of claim 13, further comprising:
   determining a subsequent light load state when the power receiving unit reaches a first level lower than a charged-up state; and
   turning off the first power transforming unit and turning on the second power transforming unit.

18. The wireless power receiving device of claim 13, further comprising:
   determining that the power receiving unit has been charged up; and
   turning off both the first power transforming unit and the second power transforming unit.

\* \* \* \* \*